United States Patent

Lillelund et al.

[11] Patent Number: 5,904,090
[45] Date of Patent: May 18, 1999

[54] BASKET AND DRIVE ARRANGEMENT FOR SALAD SPINNER

[75] Inventors: Stig Lillelund, Gentolfte; Jakob Heiberg, Charlottenlund; Mikael Koch, Virum, all of Denmark; Robert H.C.M. Daenen, Essene; Johan M.J.K. Mortier, Grimminge, both of Belgium

[73] Assignee: Dart Industries Inc., Orlando, Fla.

[21] Appl. No.: 09/164,613

[22] Filed: Oct. 1, 1998

[51] Int. Cl.$^6$ .............................. A47J 43/04; F26B 17/24; F26B 17/30
[52] U.S. Cl. .................................. 99/495; 34/58; 99/511; 210/360.1; 494/60; 494/84
[58] Field of Search .............................. 99/495, 511–513, 99/516, 410–418, 479, 485; 34/8, 58; 210/360.1, 380.1, 784, 781; 494/11, 37, 46, 60, 62, 63, 84; 241/282.1, 37.5, 92; 426/443, 478, 601; 366/234, 601; D7/665, 668

[56] References Cited

U.S. PATENT DOCUMENTS

| | | |
|---|---|---|
| D. 260,346 | 8/1981 | Lebowitz .................................. D7/665 |
| D. 376,063 | 12/1996 | Bull et al. ................................. D7/668 |
| 3,753,297 | 8/1973 | Mantelet ..................................... 34/58 |
| 3,885,321 | 5/1975 | Fouineteau ........................... 210/360.1 |
| 4,090,310 | 5/1978 | Koff ............................................ 34/58 |
| 4,103,432 | 8/1978 | Dieterich et al. ................... 366/274 X |
| 4,114,286 | 9/1978 | Bingham ............................... 99/495 X |
| 4,189,850 | 2/1980 | Dieterich et al. ........................... 34/58 |
| 4,209,916 | 7/1980 | Doyel .......................................... 34/58 |
| 4,702,162 | 10/1987 | Sontheimer et al. ................. 99/511 X |
| 5,054,209 | 10/1991 | Koff ...................................... 494/60 X |
| 5,064,535 | 11/1991 | Hsu ...................................... 210/380.1 |
| 5,317,964 | 6/1994 | Prudhomme .............................. 99/495 |
| 5,562,025 | 10/1996 | Bull et al. ................................. 99/495 |
| 5,611,265 | 3/1997 | Ronci et al. .......................... 99/410 X |
| 5,778,769 | 7/1998 | Dodson .................................... 99/536 |

FOREIGN PATENT DOCUMENTS

| | | |
|---|---|---|
| 120897 | 1/1931 | Austria . |
| 1003911 | 10/1949 | France . |
| 464379 | 8/1928 | Germany . |
| 25 18 486 | 11/1975 | Germany . |

*Primary Examiner*—Timothy F. Simone
*Attorney, Agent, or Firm*—Taylor J. Ross

[57] ABSTRACT

A salad spinner having a base which receives a basket for rotation therein. A cover mounts to the base and includes a drive plate with engages the basket to drive same. The basket includes an upper edge spaced closely to the base for stability. The basket further includes one or more access depressions permitting a user to insert a finger between the basket and base. The drive plate includes one or more drive projections which abut against the access depressions, permitting these access depressions to also be used as a portion of the drive train. The cover may be inverted to an inoperative position for reduced storage space, and a storage cap may be secured to the base to store the salad spinner, of simply the contents of the base, free from contamination.

2 Claims, 3 Drawing Sheets

BASKET AND DRIVE ARRANGEMENT FOR SALAD SPINNER

CROSS-REFERENCE TO RELATED APPLICATIONS

This application is related to co-pending design application Ser. No. 29/002,923, which is incorporated by reference herein and made a part hereof, including but not limited to those portions which specifically appear hereinafter.

BACKGROUND OF THE INVENTION

The present invention relates in general to salad spinners for removing excess water from vegetables. In particular, the present invention relates to an improved basket drive arrangement to cause an interior basket to spin, and also which improves the ease with which the basket may be removed.

Salad spinners to remove excess water from washed vegetables (typically lettuce, spinach, etc.) are well known. These devices typically include a base in the form of a bowl, and a basket which is received within the base. One of the base or basket includes a central post upon which the basket may spin within the base. This spinning creates centripetal force which removes the water from the vegetables by way of numerous apertures extending through the basket. To cause the basket to spin, a cover is provided, which fits over the base. The cover includes a lower face which may rotate with respect to the cover based upon a motor or manual action of the user. This lower face includes some arrangement to releasably engage with the basket such that rotation of the lower face causes rotation of the basket. This arrangement is often in the form of a plurality of tines extending downward from the lower face which abut against numerous ribs formed on the inner face of the basket.

While this arrangement is suitable, there is a possibility that the tines will be broken. If the cover does not have these tines, the basket can not be driven, and the device can not perform its function.

Another common problem with existing devices is the difficulty in removing the basket after spinning. To save space, and provide stability to the basket when not engaged for rotation, the basket is typically closely received within the base. This close fit does not permit the user to insert a finger between the basket and base to remove the basket. If the basket includes a simple sidewall with apertures for water removal, the user may use their fingers to apply radially outward pressure upon the inner face of the sidewall at opposed locations and lift the basket in this manner. This requires, however, that the user insert the fingers in the interior of the basket with the vegetables, risking contamination of the previously washed vegetables. This also typically causes distortion of the relatively flimsy basket, which may reduce the ability of the basket to freely spin over time.

It has been known to provide the basket with enlarged apertures at opposed locations, with these apertures being sufficiently large to permit insertion of the user's finger. Again, however, the user must insert the fingers within the interior of the basket, risking contamination. Additionally, if only one of the apertures is used (i.e., the user attempts to remove the basket using only one hand), the basket tilts about the aperture as the basket is lifted. Due to the close fit of the basket within the base, this often causes the basket to be wedged within the base, preventing removal. As such, the user must typically remove the cover, set the cover to the side, and then use both hands to remove the basket.

SUMMARY OF THE INVENTION

An object of the present invention is to provide a salad spinner having improved removal of the basket, without contamination.

Another object of the present invention is to provide a drive arrangement employing existing elements of the basket, rather than additional elements.

These and other objects are achieved by a salad spinner having a base which receives a basket for rotation therein. A cover mounts to the base and includes a drive plate with engages the basket to drive same. The basket includes an upper edge spaced closely to the base for stability. The basket further includes one or more access depressions permitting a user to insert a finger between the basket and base. The drive plate includes one or more drive projections which abut against the access depressions, permitting these access depressions to also be used as a portion of the drive train. The cover may be inverted to an inoperative position for reduced storage space, and a storage cap may be secured to the base to store the salad spinner, of simply the contents of the base, free from contamination.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
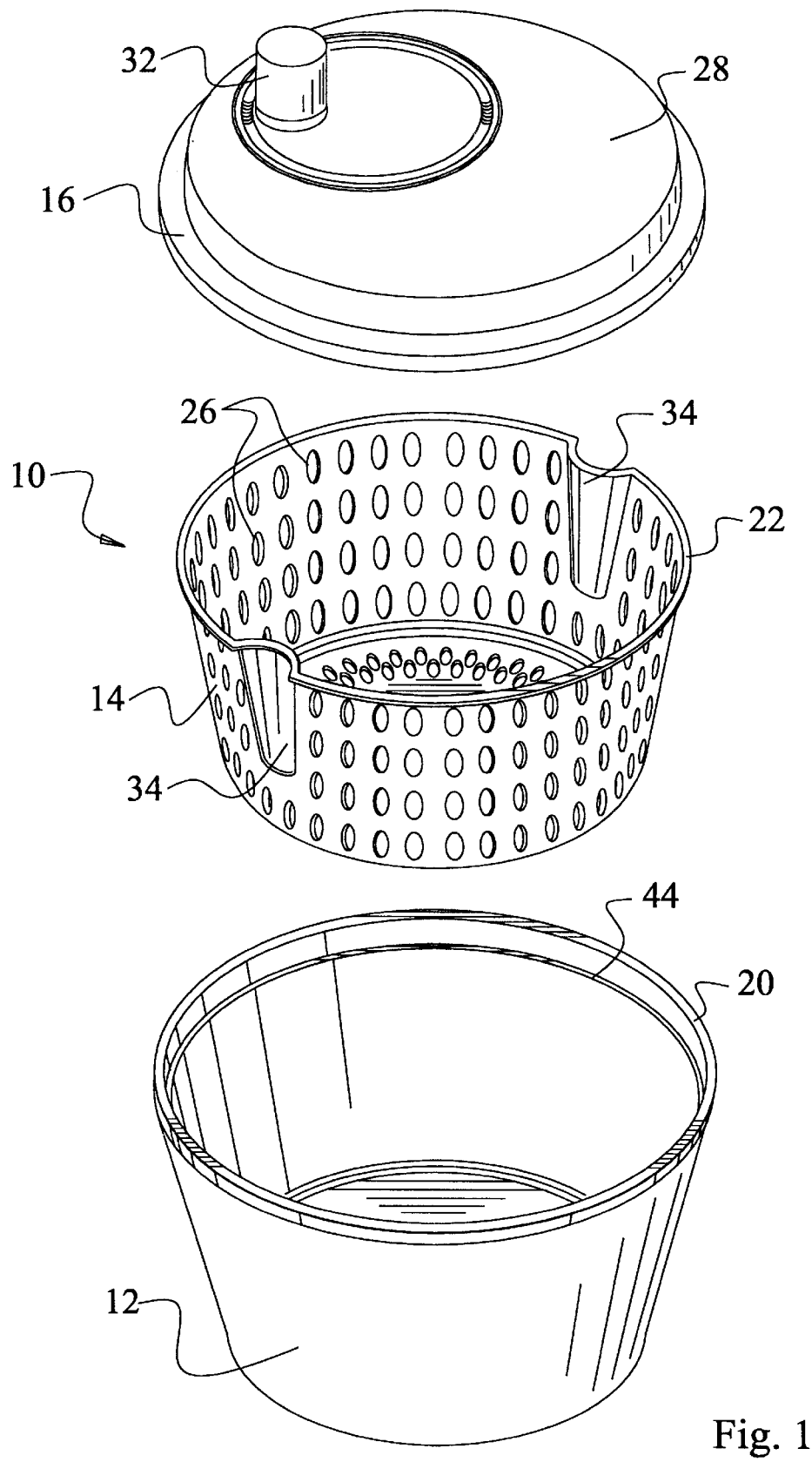
FIG. 1 is an exploded perspective view of a salad spinner according to the present invention.

With reference to FIG. 1, a salad spinner according to a preferred embodiment of the invention is generally designated by reference numeral 10. The salad spinner 10 at least includes a base 12, basket 14 and cover 16. A storage cap 18 (FIG. 5) may also be employed if desired when not in use, but is not required.

The majority of the salad spinner 10 is similar to those known in the prior art, and as such will be described in general terms. For example, the base 12 has the form of an upward opening concave defining a interior and an upper rim 20. The base 12 also has a circular cross-section defining a vertical longitudinal axis. The basket 14 takes a similar form as the base 12, and is received therein, with an upper edge 22 being in proximity to, and preferably spaced vertically below, the upper rim 20. One of the base 12 or basket 14 includes a rotation post 24 (FIG. 2) aligned with the longitudinal axis, and the other of the base 12 or basket 14 includes a mating recess receiving the rotation post 24. In the preferred embodiment, the base 12 includes the rotation post 24.

Figure 2:
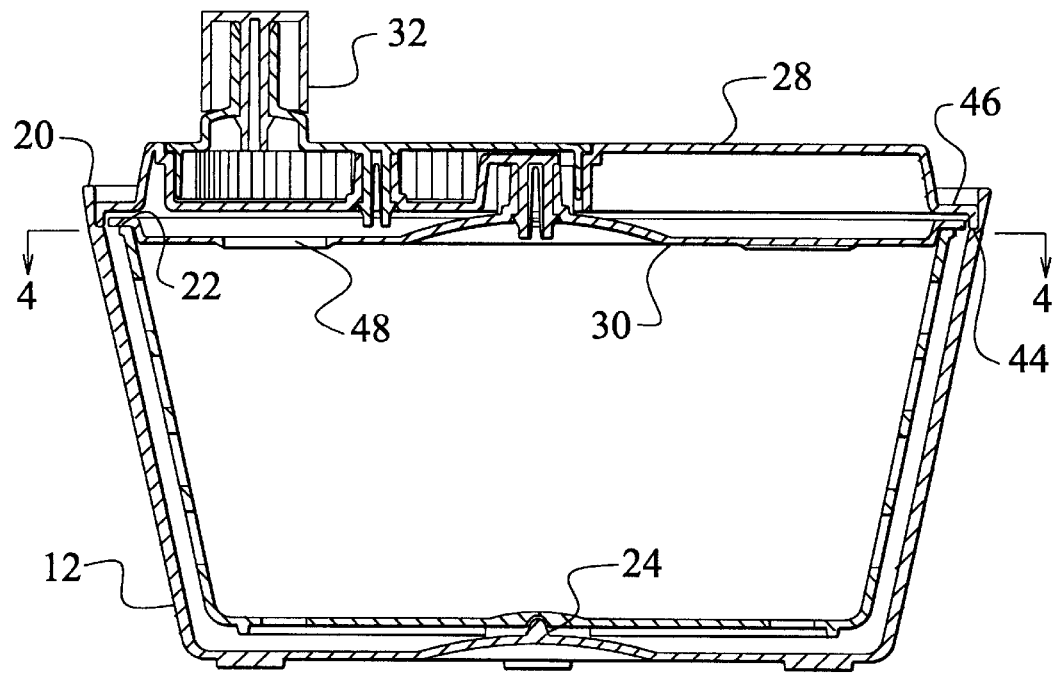
FIG. 2 is a cross-sectional side view of the salad spinner of FIG. 1 in an operative condition.

As is known, the basket 14 may rotate about the rotation post 24 when it is received thereon, as illustrated in FIG. 2. During this rotation, or spinning, excess moisture will be removed from a quantity of vegetables received within the basket 14. This excess moisture exits the basket 14 via a plurality of apertures 26 extending through the basket 14. To provide stability for the basket 14 when it is not rotating, and to reduce the size of the salad spinner 10, the basket 14 is closely received within the base 12, and in particular, the upper edge 22 of basket 14 is spaced from the base 12 by a radial distance typically smaller than the thickness of a finger.

To cause rotation of the basket 14, the cover 16 is employed. The cover 16 includes an upper plate 28 having an outer periphery which, in an operative position shown in FIG. 2, mounts upon the upper rim 20 to rest upon base 12. The cover 16 a drive plate 30 mounted to the upper plate 28 for rotation with respect to the upper plate 28. To cause rotation of the drive plate 30, the upper plate 28 mounts to, or preferably includes, a drive mechanism. This drive mechanism may take several forms, such as a motor or a manual mechanism. A manual mechanism is preferred. This may also take several forms such as a worm gear which is reciprocated, or a more convention gear arrangement which is rotated. As shown in the figures, it is preferred to employ a handle 32 which is connected to a internally-toothed gear, which is in turn connected to a spur gear fixed to the drive plate 30. Rotation of the handle 32 about the axis of the internally-toothed gear will thus cause rotation of the drive plate 30.

As in the prior art, the drive plate 30 connects to the basket 14 such that the basket 14 will rotate with the drive plate 30. The particular manner in which this connection is effected, however, is part of the improvement of the present invention. As such, the above general description of the salad spinner 10 completes those aspects which are believed to be known in the prior art.

Figure 4:
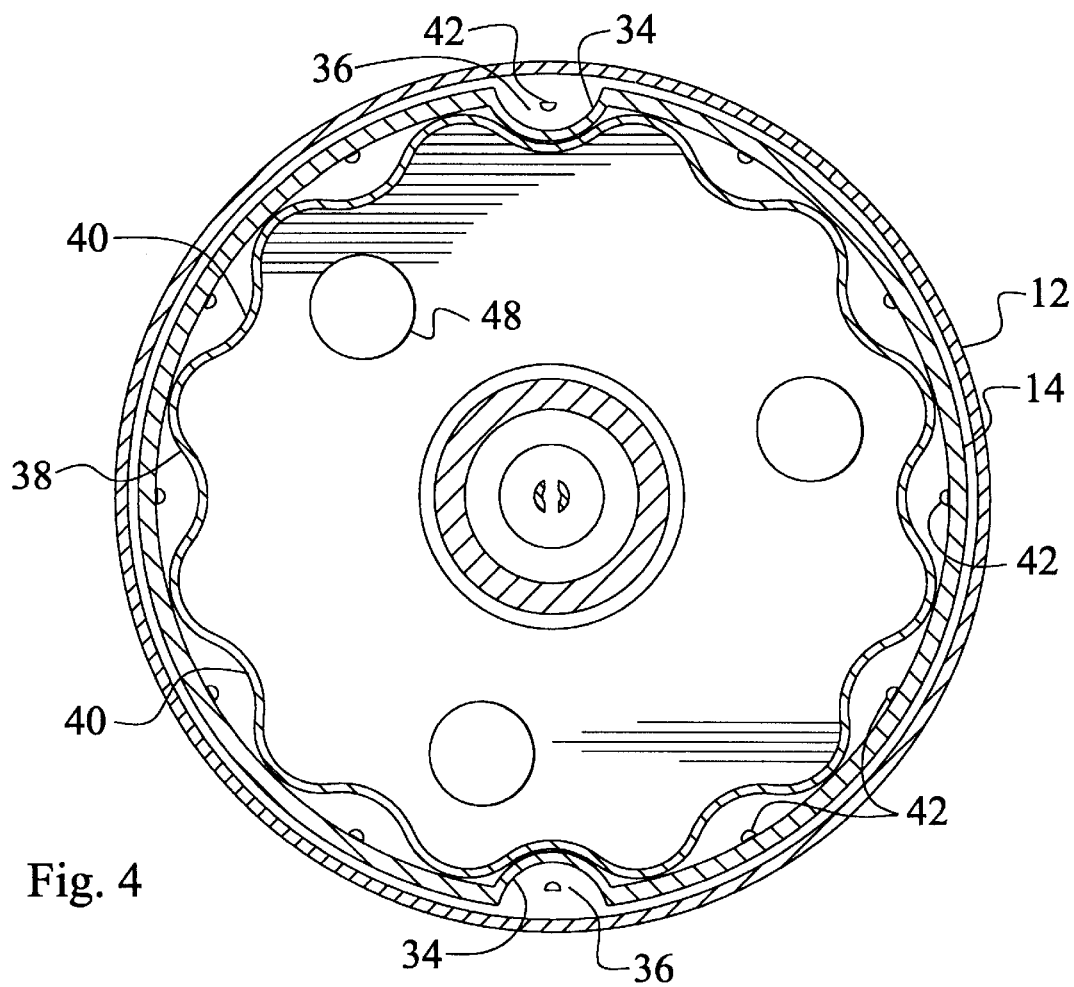
FIG. 4 is a cross-sectional view along line 4—4 of FIG. 2.

A first inventive aspect of the present invention in the arrangement for removing the basket 14 from the base 12. As best shown in FIGS. 1 and 4, the basket 14 includes at least one pair of access depressions 34, with the depressions of each pair being located at peripherally opposed positions on the basket 14. Each access depression 34 is formed by a portion of the basket 14 which is offset radially inward, and with this portion including the upper edge 22. As best illustrated in FIG. 4, each access depression 34 thus defines an access space 36 between the basket 14 and base 12. This access space 36 is sized to permit insertion of at least one finger therein, such that the user may exert radially inward pressure to grasp the basket 14 while lifting same.

This arrangement permits the user to place the basket 14 in, and remove the basket 14 from, the base 12. Further this is achieved without the user's fingers entering the interior of the basket 14. This reduces the possibility that the user will contact, and contaminate, the vegetables within basket 14. Compared to the prior art use of enlarged apertures, the use of access depressions 34 can also permit easier manufacture of basket 14. Specifically, if the basket 14 is formed of stainless steel, the prior art apertures would be formed by punching, requiring at least separate machinery, and likely a separate punching step. The access depressions 34 could, however, be formed in the same stamping operation which forms the stainless steel blank into the concave form. If formed of injection molded plastic, the prior art apertures may require separately movable mold portions, or would at least require flexing of the basket 14 during mold release, increasing the difficulty of mold design and fabrication. In contrast, a mold for forming a basket 14 with access depressions 34 would require no such consideration. As such, the present use of access depressions 34 in the basket 14 provides improvements in both the fabrication and use of the salad spinner 10.

Beyond these advantages, the access depressions 34 may also be used as the connecting point between the basket 14 and drive plate 30 to drive the basket 14 in rotation. Specifically, the drive plate 30 may include one or more drive projections 38 extending downward from the outer face thereof at a position such that, when the cover 16 is in the operative position, the drive projection 38 will abut against the access depressions 34 during rotation of the drive plate 30. The drive projection 38 may take a simple form such as a peg (not shown) extending parallel to the longitudinal axis of the salad spinner 10 and offset from the axis of rotation of the drive plate 30 a sufficient distance to abut against one of the access depressions 34. As may be envisioned, this peg would thus push the basket 14 in rotation as the drive plate 30 rotates. Such a peg is vulnerable to being broken, however, and rendering the salad spinner 10 useless.

Figure 3:
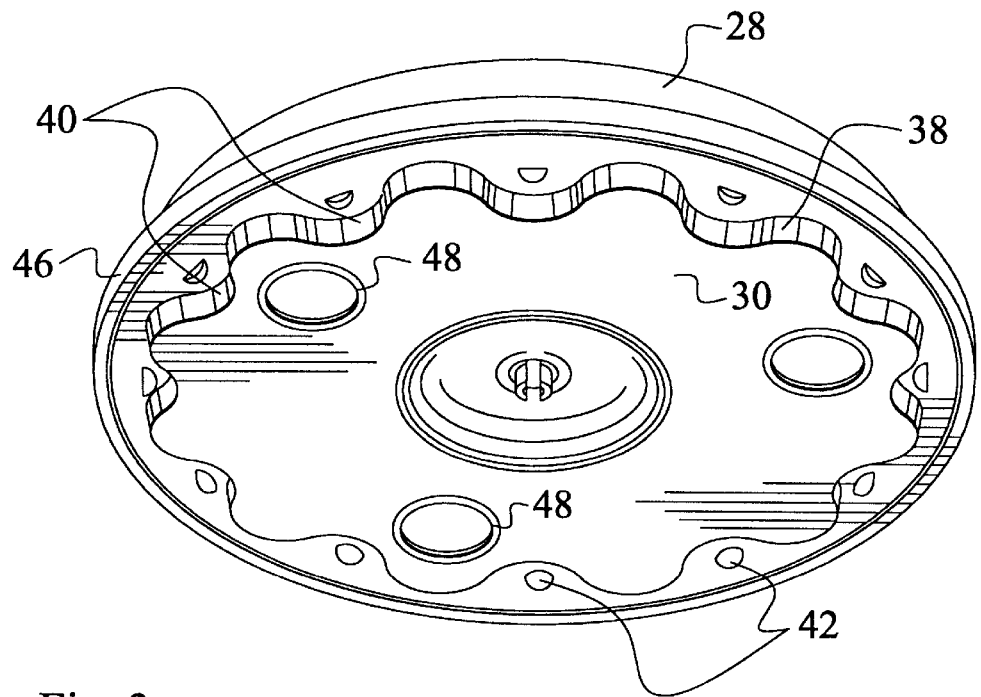
FIG. 3 is a bottom perspective view of the cover.

To reduce this possibility, it is preferred to form the drive projections 38 as a sinuous closed line extending along the periphery of the drive plate 30. As shown in FIG. 4, this sinuous closed line would define a repeated form 40 corresponding in shape to that of the access depressions 34. These forms 40 are spaced angularly about the drive plate 30. The particular angular spacing may be varied, but it is preferred to provide a sufficient number of the forms 40 to ensure that minimal or no rotation of the cover 16 is required to cause engagement between the form 40 and access depressions 34. To this end, the drive projections 38 may have a taper as shown. The sinuous closed line forming the drive projections 38 may be a relatively thin line projecting from the drive plate 30. To again reduce the possibility of breakage, it is preferred that the entire area of drive plate 30 enclosed by this line be an extension of the line, as best shown in FIG. 3, creating a raised central section with an outer periphery defining the drive projections 38.

As may be seen, the present arrangement for driving the basket 14 is simple, with reduced possibility of breakage of the drive projections 38. Additionally, no additional projections, beyond the access depressions 34 already in place, are required on the basket 14. This again simplifies the basket 14 and its formation.

While it is preferred to not have such projections, they may be employed, although for different purposes. For example, the drive projections 38 as shown will not only engage the access depressions 34 to drive the basket 14, but also abut the interior of the upper edge 22 of basket 14, forcing the basket 14 into a circular shape to avoid fouling against the interior of base 12. To further assist in this, a plurality of form projections 42 (FIGS. 3 and 4) may extend downward from the drive plate 30 at peripherally spaced locations, and at a diameter such that they will abut against the inner edge of the upper rim 22 when cover 16 is in the operative position. These form projections will serve to support the basket 14 in a circular shape against the weight of the vegetables within the basket during spinning, maintaining the circular shape of the basket 14.

While the above description relates to use of the salad spinner 10, it is also preferred to provide the salad spinner 10 with features for improving its storage and versatility.

To this end, it is preferred that the upper plate 28 mount to the base 12 in a reversible manner. Specifically, it is preferred that the base 12 include a peripheral shoulder 44 at a position spaced slightly below the upper rim 20 of base 12. Further, the cover 16 preferably has a peripheral mounting flange 46 extending outward therefrom, and sized to rest upon the peripheral shoulder 44. This will permit the cover 16 to rest upon the cover 16 in the operative position of FIG. 2. However, if the mounting flange 46 has a radially inner edge located inward of the upper edge 22 of the basket 14, the cover 16 may also be inverted to mount upon the base 12 in an inoperative position shown in FIG. 5.

This arrangement is suitable if the access depressions 34 are not employed. If the access depressions 34 are employed, these may block the entry of the upper plate 28 into the basket 14, and thus mounting of the cover 16 in the inoperative position. To overcome this, the upper plate 28 may be provided with appropriate depressions (not shown) to receive the access depressions 34. Alternatively, the inner edge of the mounting flange 46 may be spaced within the innermost extent of the access depressions 34, permitting the upper plate 28 to be received within the basket 14. In any of these arrangements, the drive plate 30 will be uppermost in the inoperative position. Since a protrusion such as the handle 32 is not readily available for the user to grasp to remove the cover 16 in this inverted position, such removal may be difficult. To overcome this, the drive plate 30 may be provided with one or more lifting apertures 48 extending therethrough. The user may thus insert a finger into the lifting apertures 48 to apply pressure in a lifting action to remove cover 16.

Figure 5:
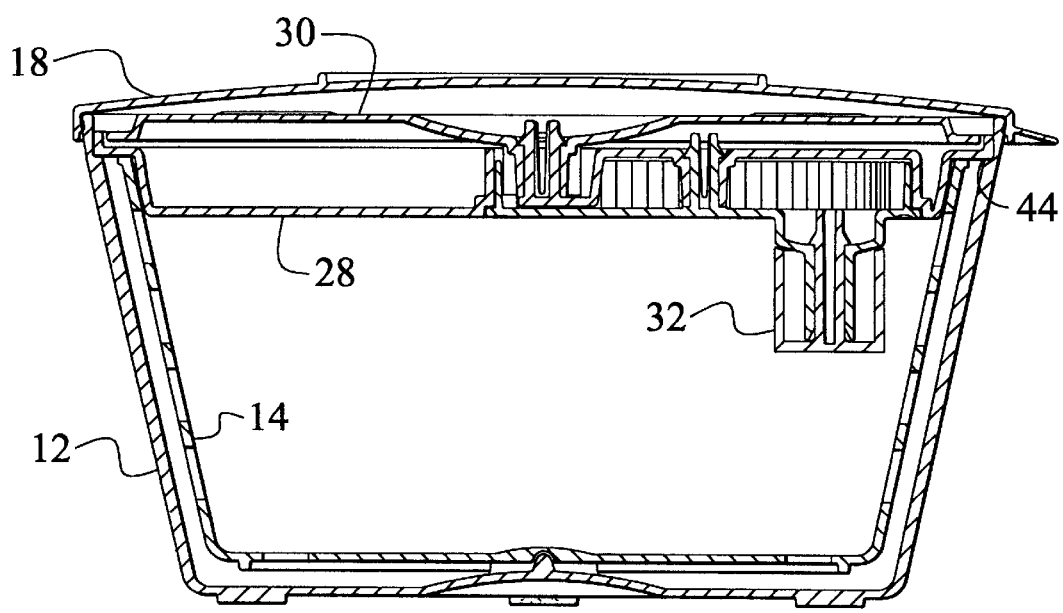
FIG. 5 is a cross-sectional side view similar to FIG. 2, although with the spinner in a storage condition.

As may be seen from comparison of the operative and inoperative positions of FIGS. 2 and 5, the inoperative position may provide appreciable savings of space. Additionally, the placement of peripheral shoulder 44 may be designed such that the storage cap 18 may be applied over the cover 16 in the inoperative position. As shown, storage cap 18 rests upon the upper rim 20 of base 12, and may be provided with a peripheral skirt fitting closely about the base 12 and creating a seal therewith. This will permit the salad spinner 10 to be stored in a manner preventing contamination and with reduced space. While not shown, this storage cap 18 will of course also be capable of mounting to base 12 when the cover 16 and basket 14 are removed. As such, the salad spinner 10 may be used in the usual manner to dry, but then the vegetables may poured from the basket 14 into the base 12 for serving, and later the storage cap 18 may be applied to the base 12 to store the vegetable within base 12 in a secure manner.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. In a salad spinner having a base receiving a basket for relative rotation therein, and a cover mounted to said base and having a drive mechanism causing said relative rotation, said basket including an upper edge having a close fit within said base, the improvement comprising:

said basket including at least one access depression in the form of a radially inward depression opening onto said upper edge, and defining an access space between said basket and said base, said access space being sized to receive at least one finger therein.

2. The improvement of claim 1, wherein said cover includes an upper plate and a drive plate mounted thereto for relative rotation, said drive plate including at least one drive projection extending downward therefrom at a position to abut against said at least one access depression when said cover is mounted to said base in an operative position.

\* \* \* \* \*